US010509706B2

(12) United States Patent
Agarwal et al.

(10) Patent No.: US 10,509,706 B2
(45) Date of Patent: Dec. 17, 2019

(54) IDENTIFICATION OF AN ALTERNATE PRINCIPAL MEMBER PORT BY A TARGET DEVICE IN A STORAGE AREA NETWORK

(71) Applicant: Hewlett Packard Enterprise Development LP, Houston, TX (US)

(72) Inventors: Vivek Agarwal, Marlborough, MA (US); Krishna Puttagunta, Rocklin, CA (US); Rupin T. Mohan, Northborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 15/704,224

(22) Filed: Sep. 14, 2017

(65) Prior Publication Data

US 2019/0079837 A1 Mar. 14, 2019

(51) Int. Cl.
*G06F 11/20* (2006.01)
*H04L 12/24* (2006.01)

(52) U.S. Cl.
CPC ...... *G06F 11/2002* (2013.01); *H04L 41/0668* (2013.01)

(58) Field of Classification Search
CPC .............. G06F 11/008; G06F 11/2002; H04L 41/0663; H04L 41/0668; H04L 67/1097; H04L 69/40
See application file for complete search history.

(56) References Cited

U.S. PATENT DOCUMENTS

| 7,058,844 B2 * | 6/2006 | Wiley | H04L 1/0061 714/4.5 |
| 7,275,103 B1 * | 9/2007 | Thrasher | H04L 45/22 709/223 |
| 7,930,583 B1 * | 4/2011 | Vemuri | G06F 11/0727 709/223 |
| 8,209,409 B2 * | 6/2012 | Mopur | G06F 11/008 709/223 |

(Continued)

FOREIGN PATENT DOCUMENTS

| WO | WO-2013118195 A1 | 8/2013 |
| WO | WO-2017078662 A1 | 5/2017 |

OTHER PUBLICATIONS

Boucadair, M. et al., "Software-Defined Networking: A Perspective From Within a Service Provider," (Research Paper), Jul. 10, 2014, 12 pages, https://tools.ietf.org/id/draft-sin-sdnrg-sdn-approach-09.html.

(Continued)

*Primary Examiner* — Joseph R Kudirka
(74) *Attorney, Agent, or Firm* — Trop, Pruner & Hu, P.C.

(57) ABSTRACT

Examples disclosed herein relate to identification of an alternate principal member port by a target device in a Storage Area Network (SAN). In some examples, a target device in a SAN may determine that a principal member port of a target driven peer zone on the target device is likely to fail based on diagnostic information related to the principal member port. The target driven peer zone may be configured in the SAN via the target device. In response to determining, (Continued)

the target device may identify an alternate principal member port on the target device. The target device may perform an action to indicate the alternate principal member port as the principal member port.

17 Claims, 4 Drawing Sheets

(56) References Cited

U.S. PATENT DOCUMENTS

| | | | | |
|---|---|---|---|---|
| 8,705,351 | B1* | 4/2014 | McGlaughlin | H04L 67/1097 370/220 |
| 9,081,502 | B2* | 7/2015 | Nakajima | H04L 67/1097 |
| 9,229,645 | B2* | 1/2016 | Nakajima | G06F 3/0607 |
| 9,483,338 | B2 | 11/2016 | Bhalla et al. | |
| 9,590,892 | B2 | 3/2017 | Heydari et al. | |
| 9,628,340 | B2 | 4/2017 | Blair | |
| 10,148,483 | B1* | 12/2018 | Lippitt | H04L 47/70 |
| 2016/0204979 | A1* | 7/2016 | Benner | H04L 41/0677 370/242 |
| 2016/0294732 | A1 | 10/2016 | Chou et al. | |
| 2017/0070387 | A1 | 3/2017 | Rao et al. | |

OTHER PUBLICATIONS

Extended European Search Report received in EP Application No. 17207620.0, dated May 22, 2018, 13 pages.

Wikipedia, "Telnet,", available online at <https://en.wikipedia.org/w/index.php?title=Telnet&oldid=797310641>, Aug. 26, 2017, 5 pages.

Wikipedia, "Storage Management Initiative—Specification", available online at <https://en.wikipedia.org/w/index.php?title=Storage_Management_Initiative_%E2%80%93_Specification&oldid=797310318>, Aug. 26, 2017, 3 pages.

Wikipedia, "Simple Network Management Protocol", available online at <https://en.wikipedia.org/w/index.php?title=Simple_Network_Management_Protocol&oldid=795542837>, Aug. 14, 2017, 11 pages.

Snia, "Storage Management Technical Specification", SMI-S 1.7.0, Part 1: Overview, Revision 5, available online at <https://www.snia.org/sites/default/files/technical_work/SMIS/SMI-Sv1.7.0r5_Overview.book_.pdf>, Mar. 8, 2016, pp. 1-46.

Dell Inc., "Dell EqualLogic SAN HQ", available online at <https://www.dell.com/downloads/global/products/pvaul/en/equallogic-san-headquarters.pdf>, 2012, 2 pages.

* cited by examiner

IDENTIFICATION OF AN ALTERNATE PRINCIPAL MEMBER PORT BY A TARGET DEVICE IN A STORAGE AREA NETWORK

BACKGROUND

A Storage Area Network (SAN) is a high-speed network that may connect multiple storage devices with multiple servers. A SAN provides block-level storage that may be accessed by applications running on any associated server. A storage area network removes storage from servers and consolidates it in a manner that each server in a SAN may access shared storage as if it is directly attached to the server. A SAN thus serves as a pool of storage for servers in the network.

BRIEF DESCRIPTION OF THE DRAWINGS

The following detailed description references the drawings, wherein.

DETAILED DESCRIPTION

Figure 1:
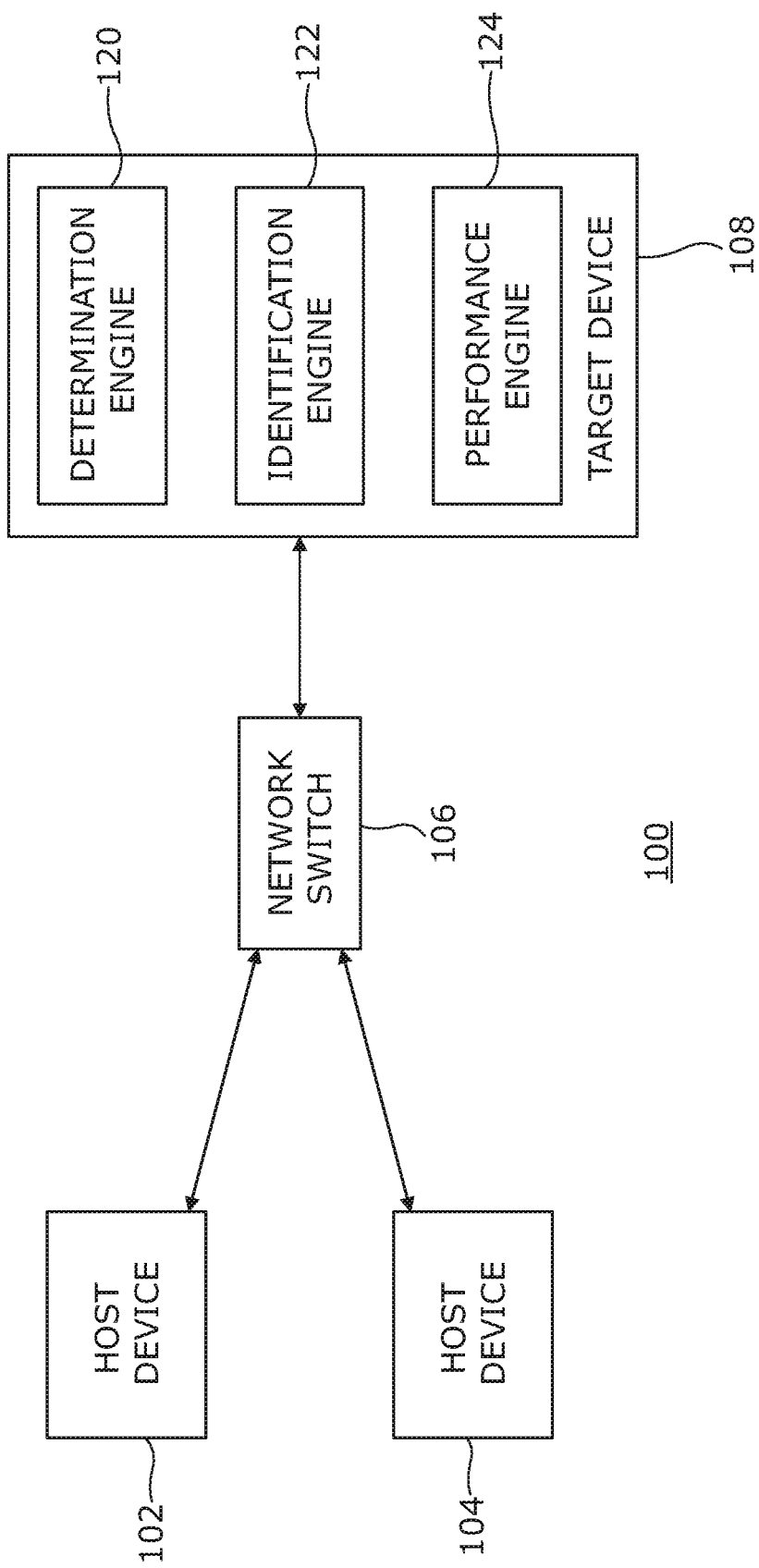
FIG. 1 is a block diagram of an example computing environment for identifying an alternate principal member port by a target device.

A SAN typically includes a dedicated network of storage devices that are generally not accessible through the local area network (LAN) by other devices. SAN plays a useful role in any data center by providing access and connectivity between storage arrays and servers via a dedicated network. This dedicated network may use Fiber Channel (FC) storage protocol.

In some examples, zoning may be implemented in a SAN to control who can see what in a SAN. Zoning is a logical separation of traffic between host and resources. By breaking up a network into zones, processing activity is distributed evenly across a network so that no single device is overburdened. To build a SAN zone, an administrator may consider information related to, for example, network fabric, switch ports, target ports, initiator ports, SAN fabric usage pattern, target storage system, target port availability, customer Service Level Agreement (SLA), and zone design pattern, etc.

One of the challenges with large SANs is keeping them up and running all the time because any downtime could be expensive and complex to triage. To avoid downtime, SANs may be continuously monitored to address any challenges in a timely manner. Fibre Channel zoning is a feature that adds to security and better management of a SAN by providing segregation and allowing controlled communication among selected devices within the network fabric. However, preempting potential issues in a SAN installation is a challenging task.

For example, in a target orchestrated peer zoning in a Fiber Channel based SAN, a peer zone may include a principal member port and peer member ports. In a peer zone, communication between a principal member port and a peer member port is allowed, but communication is not allowed between any two peer members. In case of any fault related to the principal member port, communication path between the principal member port and peer member ports may be affected. This is not a desirable scenario in a SAN.

To address these technical challenges, the present disclosure describes various examples for identifying an alternate principal member port by a target device in a storage area network. A target device in a Storage Area Network (SAN) may determine that a principal member port of a target driven peer zone on the target device is likely to fail based on diagnostic information related to the principal member port. The target driven peer zone may be configured in the SAN via the target device. In response to determining, the target device may identify an alternate principal member port on the target device. The target device may perform an action to indicate the alternate principal member port as the principal member port.

Proposed solution uses the target port diagnostic information to identify the near-failing storage array target port. It analyzes the diagnostic data for any failure prediction and, based upon the analysis, the target device may take an in-band corrective action to replace the failing principal member with the peer target port to maintain an end-to-end host to target data connectivity path.

FIG. 1 is a block diagram of an example computing environment 100 for identifying an alternate principal member port by a target device. In some examples, computing environment 100 may include host devices 102 and 104, a network switch 106, and a target device 108. Although two host devices, one network switch, and one target device are shown in FIG. 1, other examples consistent with this disclosure may include more or less than two host devices, more than one network switch, and more than one target device. In some examples, computing environment 100 may represent a storage area network.

Host devices 102 and 104 may each represent any type of computing device capable of reading machine-executable instructions. Examples of host devices 102 and 104 may each include, without limitation, a server, a desktop computer, a notebook computer, a tablet computer, a thin client, a mobile device, a personal digital assistant (PDA), a phablet, and the like. As used herein, the term "server" may include a computer and/or a computer program (machine-readable instructions) that may process requests from other (client) computers over a network.

Target device 108 may be a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Redundant Array of Inexpensive Disks (RAID), a data archival storage system, or a block-based device over a storage area network (SAN). In one example, the storage device may be a storage array, which may include one or more storage drives (for example, hard disk drives, solid state drives, etc.).

Host devices 102 and 104 may each be communicatively coupled to target device 108, for example, via a network fabric. As used herein, the term "network fabric" may refer to a network topology in which components may exchange data with each other through interconnecting network devices. In some examples, the network fabric may include one or multiple network devices, for example, network switch 106, a network router, cables, etc. Host devices 102 and 104 may each connect to the network fabric via respective Host Bus Adaptors (HBAs).

Some example communication protocols that may be used by host devices 102 and 104 to communicate with target device 108 via the network fabric may include Fibre Channel (FC), Ethernet, Internet Small Computer System Interface (iSCSI), HyperSCSI, ATA over Ethernet (AoE), and Fibre Channel over Ethernet (FCoE).

In some examples, host devices 102 and 104 may each be referred to as an "initiator". The initiator may initiate a connection over the network fabric to one or multiple ports ("target ports") on target device 108. A target port may provide access to a storage volume to the initiator.

As mentioned earlier, in some examples, Fibre Channel protocol may be used as the communication protocol by a host device (for example, 102) to communicate with target device 108 via the network fabric. In some examples, Fibre Channel zoning may be implemented in SAN. As used herein, Fiber Channel zoning may include partitioning of a Fibre Channel fabric into smaller subsets to, for example, restrict interference, add security, and simplify management of SAN. Through zoning, devices in SAN may be divided into logical groups over the physical configuration of the network fabric. Zoning may limit a device in SAN to access a controlled subset of other devices or ports. Each device in SAN may be placed into multiple zones.

A zone set may comprise of one or more zones. A zone may be a member of more than one zone set and comprise of multiple zone members. Members in a zone may access each other, however members in different zones cannot access each other. A device may belong to more than one zone. Only one zone set can be activated at any time.

In some examples, target device 108 may include a determination engine 120, an identification engine 122, and a performance engine 124.

Engines 120, 122, and 124 may include any combination of hardware and programming to implement the functionalities of the engines described herein, but at least include hardware that is configured to perform the functionalities. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of target device 108. In some examples, the at least one machine-readable storage medium may store instructions that, when executed by the at least one processing resource, at least partially implement some or all engines of target device 108. In such examples, target device 108 may include the at least one machine-readable storage medium storing the instructions and the at least one processing resource to execute the instructions.

Determination engine 120 in target device 108 of SAN may determine that a principal member port of a target driven peer zone on target device 108 is likely to fail based on diagnostic information related to the principal member port. In some examples, target driven peer zoning may be implemented in the network fabric of SAN. Each peer zone may include a principal member port and peer member ports. In a peer zone, communication between a principal member port and a peer member port is allowed, but communication is not allowed between any two peer members. A target driven peer zone is a peer zone that is configured in the network fabric through target device 108. Target driven peer zoning does not involve any zone pre-configuration requirement before hosts can be provisioned to target device 108. This significantly reduces the time needed to configure SAN. Without target driven peer zoning, an administrator may have to preconfigure zones on network switch 106 before configuring hosts 102 and 104. Through target driven peer zoning a user may directly start provisioning hosts to target device 108, for example, via a Command Line Interface (CLI).

In some examples, network devices in the network fabric (for example, 104) of SAN may use Read Diagnostics Parameters (RDP) command to obtain diagnostic information in-band from all end devices attached to the fabric on a periodic basis. As used herein, "in-band" network access may refer to a network usage wherein the same network may be used to monitor and control a data network and to communicate data packets not used for management or control of that data network. In some examples, during in-band network access, network management information (for example, via Simple Network Management Protocol (SNMP) packets) may travel the same network path as normal data packets (i.e., data packets whose content does not relate to management or control of that network).

Examples of the end devices may include storage systems (for example, 108), host adapters, and switches (for example, 104) in the network fabric. The periodicity may be programmed, for example, from 30 minutes to 24 hours depending on, for example, the size of the fabric. Examples of the diagnostic information may include Small form-factor pluggable (SFP) diagnostic data such as temperature, voltage, Tx and Rx power and Tx bias, port speed descriptor—supported speeds and current speed, Link Error Status Block (LESB) data—link failure, loss-of-sync, loss-of-signal counts, and invalid CRC counts. Once configured, each switch (for example, 106) in the fabric may collect this data from all the devices connected to it, as well as all ports on the switch, thus collecting data from both ends of the links. In an example, the diagnostic information may be stored in a distributed database on network switch 106 from where it may be accessed by target device 108.

Target device 108 may analyze the diagnostic information that it obtains from network switch 106 to determine whether a principal member port of a target driven peer zone on target device 108 is likely to fail. In some examples, target device 108 may constantly analyze diagnostic data, for example, temperature, supply voltage, bias current, Tx power and Rx power of principal port transceivers and determine their health on a periodic basis. These values may be compared against pre-defined warning thresholds and alarm thresholds. If any of these parameters cross warning thresholds or stay within alarm thresholds over an extended period of time (for example, a few days), then the component could be identified as likely to fail. For example, if the component temperature is below 0° C. or above 80° C. (alarm thresholds), for a pre-defined time, the principal member port of a target driven peer zone may be identified as a candidate that is about to fail. In another example, if CRC errors of the link are incrementing, for example, at the rate of 5 errors/hour, the principal member port may be identified as likely to fail. In a further example, if there are link events (for example, loss of synchronization) occurring regularly within a pre-defined period (for example, five per hour), the principal member port of a target driven peer zone may be identified as a candidate that is about to fail.

In response to a determination by determination engine 120 that the principal port member of the target driven peer zone is likely to fail, identification engine 122 may identify an alternate principal member port on the target device 108. In some examples, identification engine 122 may identify, from the available ports on target device 108, a port that is physically coupled to the network fabric based upon fabric ID. Identification engine 122 may identify such port as the alternate principal member port on the target device 108.

Once the alternate principal member port on the target device 108 is identified, performance engine 124 may perform an action to indicate the alternate principal member port as the principal member port. In some examples, the "action" may include sending, by performance engine 124, a replace principal member request to network switch 106 to replace principal member port of the target driven peer zone with the alternate principal member port. The request may include details such as a peer zone name, a principal member port identifier (for example, a World Wide Name (WWN)) and an alternate principal member port identifier (for example, a WWN). In an example, the request may be sent in-band to network switch 106. In response, network switch 106 may determine whether the principal member port that is requested to be replaced pertains to a peer zone. If the request pertains to a peer zone, network switch 106 may determine whether the peer zone is a member of an active zone set. In response to a determination that the peer zone is a member of an active zone set, network switch 106 may accept the request. On the other hand, in response to a determination that the peer zone is not a member of an active zone set, network switch 106 may reject the request. Network switch 106 may proceed to add the alternate principal member port into the existing target driven peer zone. After adding the alternate principal member port, network switch 106 may indicate the alternate principal member port as the principal member port for the peer zone, and remove the earlier principal member port from the peer zone. A database maintained on network switch 106 may be updated to reflect this change. Network switch 106 may notify about the change related to the principal member port to the peer members (for example, initiators 102 and 104) in the peer zone, and to target device 108. In some examples, the notification may occur via a registered state change notification (RSCN). In response to the notification, the initiators 102 and 104 may login to target device 108 via the alternate principal member port. In response to the notification, target device 108 may update its internal database to reflect the alternate principal member port as the principal member port. Target device 108 may receive all subsequent messages from switch 108 at the alternate principal member port.

In another example, the "action" may include creating, by performance engine 124 on target device 108, a new peer zone that includes the alternate principal member port and the peer members of the peer zone that the principal member port was previously a part of. In some examples, the new peer zone may be created via command "AAPZ—add/replace active peer zone". A database maintained on network switch 106 may be updated to reflect the new peer zone. Once the new peer zone is created, performance engine 124 may remove the peer zone that the principal member port was previously a part of. In some examples, the earlier peer zone may be removed via command "RAPZ—remove active peer zone". Since AAPZ and RAPZ are switch commands, creation of the new peer zone and removal of the earlier peer zone are transparent to network switch 106. Target device 108 may update its database to reflect the alternate principal member port as the principal member port.

Figure 2:
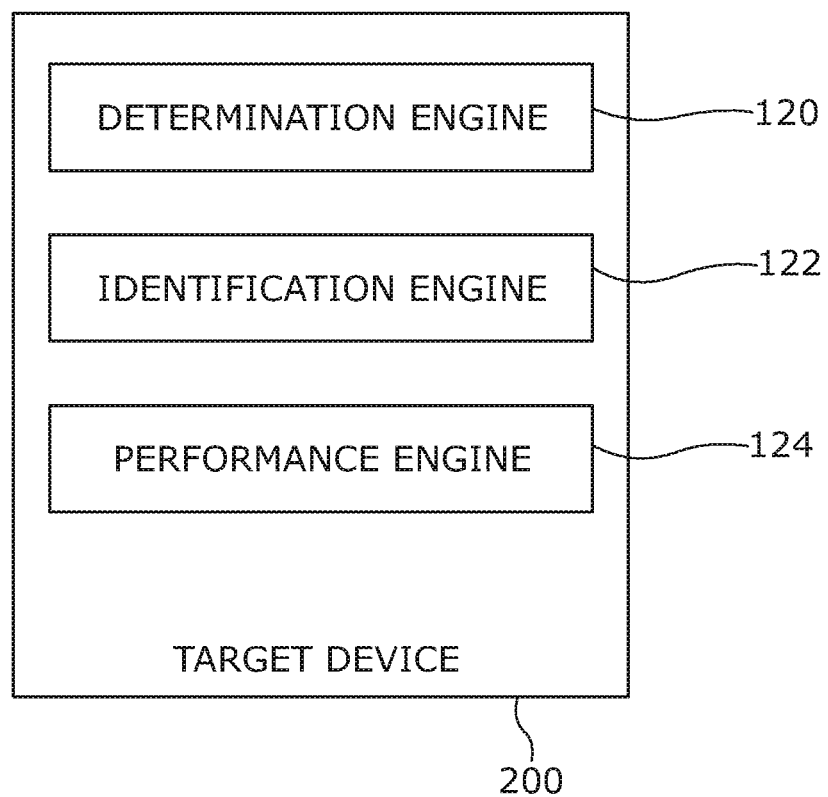
FIG. 2 is a block diagram of an example target device for identifying an alternate principal member port in a storage area network.

FIG. 2 is a block diagram of an example target device 200 for identifying an alternate principal member port in a storage area network. In some examples, target device 200 may be implemented by any suitable device, as described herein in relation to target device 108 of FIG. 1, for example.

In some examples, target device 200 may include a determination engine 120, an identification engine 122, and a performance engine 124, as described above in relation to FIG. 1.

In some examples, determination engine 120 on target device 200, which may be present in a SAN, may determine that a principal member port of a target driven peer zone on target device 200 is likely to fail based on diagnostic information related to the principal member port. The target driven peer zone may be configured in the SAN via target device 200. In response to the determination, identification engine 122 may identify an alternate principal member port on target device 200. Subsequent to the identification, performance engine 124 may send a request to a network switch in the SAN to replace the principal member port of the target driven peer zone with the alternate principal member port. Performance engine 124 may then determine that the request has been completed.

Figure 3:
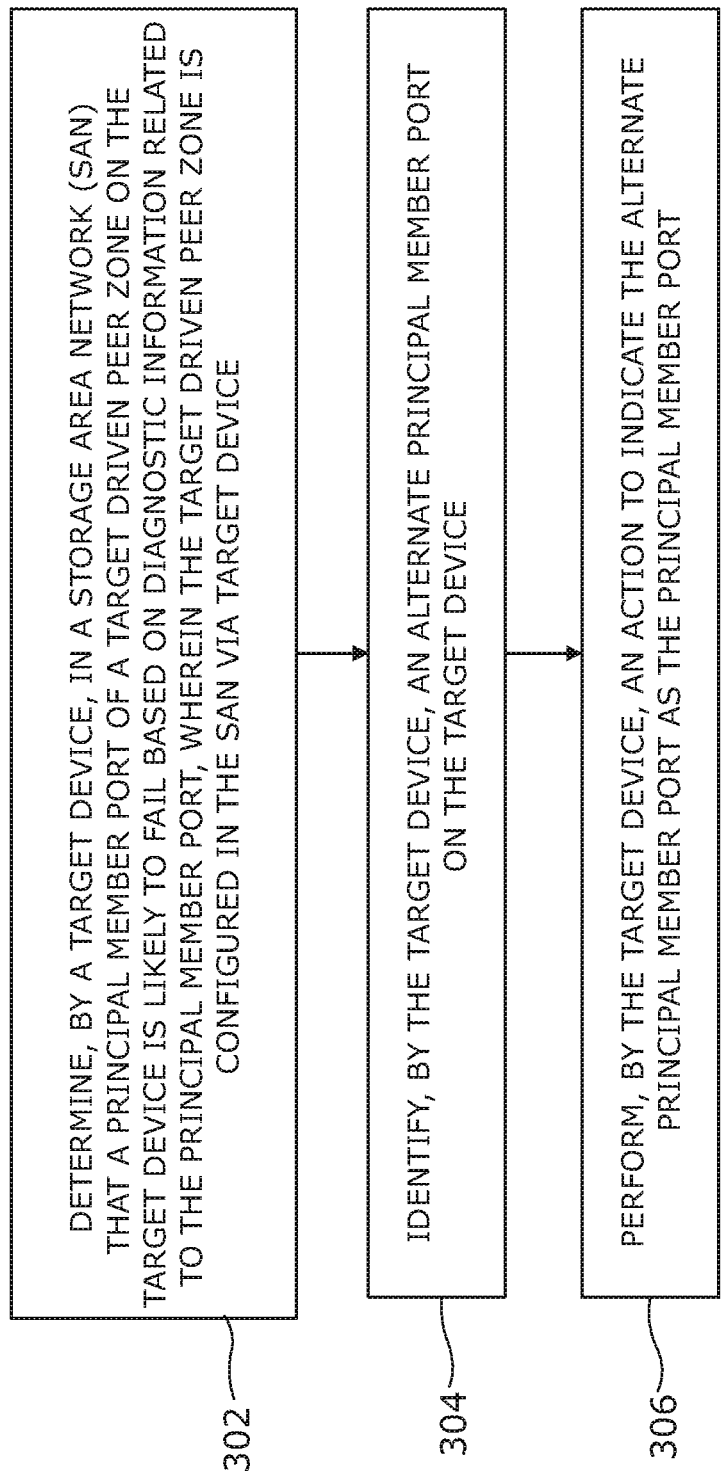
FIG. 3 is a block diagram of an example method of identifying an alternate principal member port by a target device in a storage area network.

FIG. 3 is a block diagram of an example method 300 for identifying an alternate principal member port in a storage area network. The method 300, which is described below, may be fully or partially executed on a device such as target device 108 of FIG. 1, or target device 200 of FIG. 2. However, other suitable network or computing devices may execute method 300 as well. At block 302, a target device in a Storage Area Network (SAN) may determine that a principal member port of a target driven peer zone on the target device is likely to fail based on diagnostic information related to the principal member port. The target driven peer zone may be configured in the SAN via the target device. At block 304, in response to determining, the target device may identify an alternate principal member port on the target device. At block 306, the target device may perform an action to indicate the alternate principal member port as the principal member port.

Figure 4:
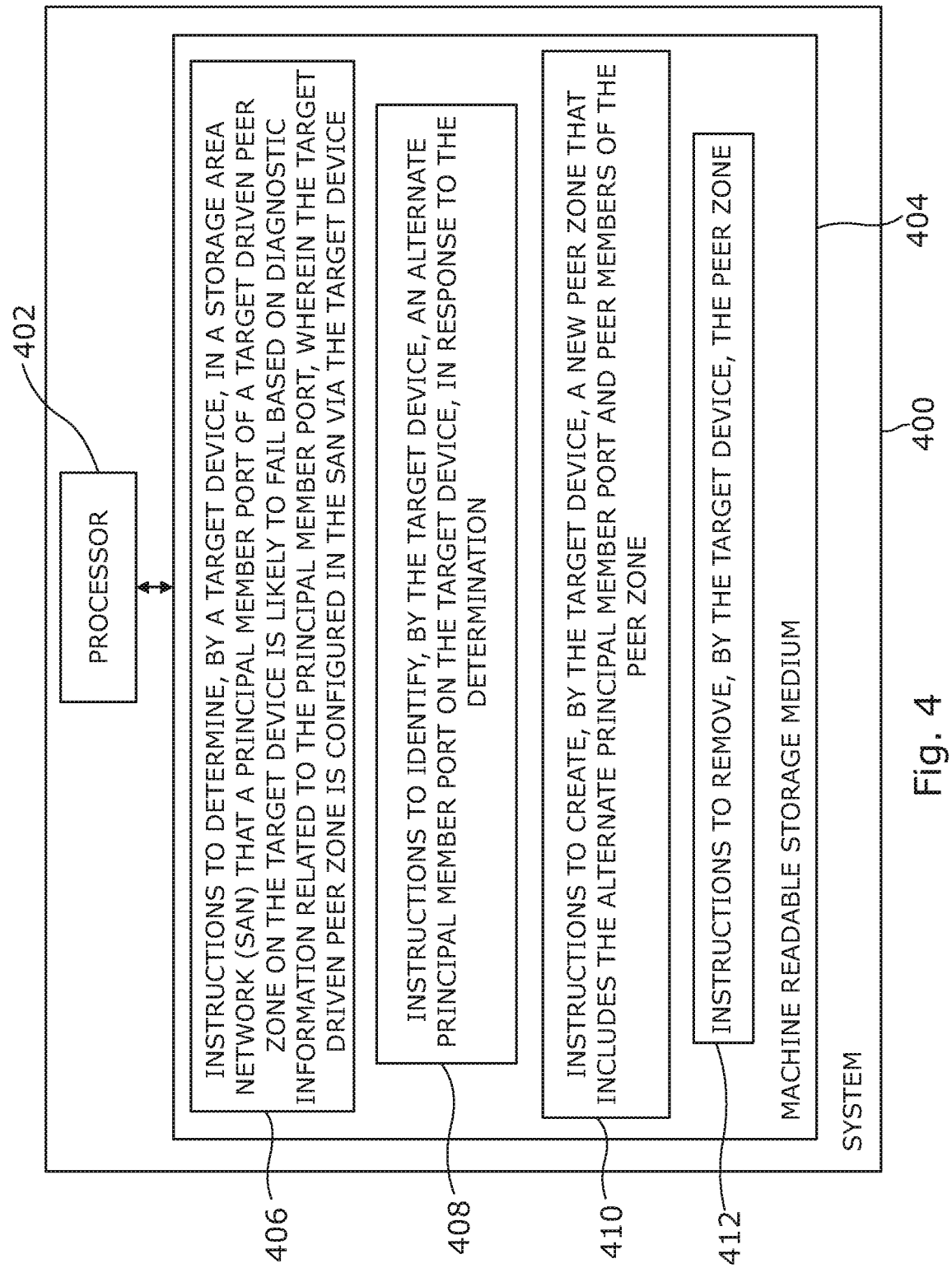
FIG. 4 is a block diagram of an example system including instructions in a machine-readable storage medium to identify an alternate principal member port by a target device in a storage area network.

FIG. 4 is a block diagram of an example system 400 including instructions in a machine-readable storage medium to identify an alternate principal member port in a storage area network. System 400 includes a processor 402 and a machine-readable storage medium 404 communicatively coupled through a system bus. In some examples, system 400 may be analogous to target device 108 of FIG. 1, or target device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium may be a non-transitory machine-readable medium.

Machine-readable storage medium 404 may store instructions 406, 408, 410, and 412. In some examples, instructions 406 may be executed by processor 402 to determine in a Storage Area Network (SAN) that a principal member port of a target driven peer zone on the target device is likely to fail based on diagnostic information related to the principal member port, wherein the target driven peer zone is configured in the SAN via the target device. In response to the determination, instructions 408 may be executed by processor 402 to identify an alternate principal member port on the target device, in response to the determination. Instructions 410 may be executed by processor 402 to create a new peer zone that includes the alternate principal member port and peer members of the peer zone. Instructions 412 may be executed by processor 402 to remove the peer zone that the principal member port was previously a part of.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
determining, by a target device in a Storage Area Network (SAN), that a first principal member port of a target driven peer zone on the target device is likely to fail based on diagnostic information related to the first principal member port, wherein the target driven peer zone is configured in the SAN via the target device, and wherein the diagnostic information based on which the target device determines that the first principal member port is likely to fail comprises a parameter of a transceiver for the first principal member port;
in response to the determining, identifying, by the target device, an alternate principal member port on the target device; and
providing, by the target device, an indication comprising an identifier of the first principal member port and an identifier of the alternate principal member port, the indication to cause replacement of the first principal member port with the alternate principal member port as a principal member port in the target driven peer zone.

2. The method of claim 1, wherein providing the indication comprises:
sending, by the target device, a request to a network switch in the SAN to replace the first principal member port of the target driven peer zone with the alternate principal member port; and
determining, by the target device, that the request has been completed.

3. The method of claim 2, wherein the request further comprises a name of the target driven peer zone.

4. The method of claim 2, wherein determining that the request has been completed comprises:
receiving, by the target device, a notification indicating that the request has been completed.

5. The method of claim 1, wherein the parameter of the transceiver for the first principal member port comprises a parameter selected from among a temperature, a supply voltage, a current, and a power of the transceiver for the first principal member port.

6. The method of claim 1, wherein the parameter of the transceiver for the first principal member port comprises an error rate of a link over which the first principal member port communicates.

7. A target device comprising:
a processor; and
a non-transitory storage medium comprising instructions executable on the processor to:
determine in a Storage Area Network (SAN) that a first principal member port of a target driven peer zone on the target device is likely to fail based on diagnostic information related to the first principal member port, wherein the target driven peer zone is configured in the SAN via the target device, and wherein the diagnostic information based on which the target device determines that the first principal member port is likely to fail comprises a parameter of a transceiver for the first principal member port;
identify, in response to the determination, an alternate principal member port on the target device;
send a request to a network switch in the SAN to replace the first principal member port of the target driven peer zone with the alternate principal member port, the request comprising an identifier of the first principal member port and an identifier of the alternate principal member port; and
determine that the request has been completed.

8. The target device of claim 7, wherein the SAN comprises a Fibre Channel-based SAN.

9. The target device of claim 7, wherein the alternate principal member port on the target device is physically coupled to the network switch.

10. The target device of claim 7, wherein the target device comprises a storage device.

11. The target device of claim 7, wherein the target device is to send the request in-band to the network switch.

12. The target device of claim 7, wherein the parameter of the transceiver for the first principal member port comprises a parameter selected from among a temperature, a supply voltage, a current, and a power of the transceiver for the first principal member port.

13. A non-transitory machine-readable storage medium comprising instructions that upon execution cause a target device to:
 determine in a Storage Area Network (SAN) that a first principal member port of a target driven peer zone on the target device is likely to fail based on diagnostic information related to the first principal member port, wherein the target driven peer zone is configured in the SAN via the target device, and wherein the diagnostic information based on which the target device determines that the first principal member port is likely to fail comprises a parameter of a transceiver for the first principal member port;
 identify an alternate principal member port on the target device, in response to the determination; and
 send an indication comprising an identifier of the first principal member port and an identifier of the alternate principal member port, the indication to cause replacement of the first principal member port with the alternate principal member port as a principal member port in the target driven peer zone.

14. The non-transitory machine-readable storage medium of claim 13, wherein the instructions upon execution cause the target device to:
 obtain the diagnostic information related to the first principal member port from a network switch in the SAN.

15. The non-transitory machine-readable storage medium of claim 14, wherein the diagnostic information comprises Small form-factor pluggable (SFP) diagnostic data and a Link Error Status Block (LESB) count.

16. The non-transitory machine-readable storage medium of claim 14, wherein providing the indication comprises sending the indication to the network switch.

17. The non-transitory machine-readable storage medium of claim 13, wherein instructions upon execution cause the target device to:
 identify a port on the target device that is physically coupled to a network fabric of the SAN; and
 select the port as the alternate principal member port.

* * * * *